(12) United States Patent
Miyamoto et al.

(10) Patent No.: US 9,242,637 B2
(45) Date of Patent: Jan. 26, 2016

(54) VEHICLE CONTROL SYSTEM

(71) Applicants: Tomohiko Miyamoto, Toyota (JP); Noriyuki Yagi, Kariya (JP); Shigeru Matsumura, Okazaki (JP); Kenjiro Nagata, Okazaki (JP); Masatoshi Sugimoto, Nishio (JP)

(72) Inventors: Tomohiko Miyamoto, Toyota (JP); Noriyuki Yagi, Kariya (JP); Shigeru Matsumura, Okazaki (JP); Kenjiro Nagata, Okazaki (JP); Masatoshi Sugimoto, Nishio (JP)

(73) Assignees: TOYOTA JIDOSHA KABUSHIKI KAISHA, Aichi-ken (JP); AISIN SEIKI KABUSHIKI KAISHA, Aichi-ken (JP); AISIN AW CO., LTD., Aichi-ken (JP)

( * ) Notice: Subject to any disclaimer, the term of this patent is extended or adjusted under 35 U.S.C. 154(b) by 0 days.

(21) Appl. No.: 14/384,806

(22) PCT Filed: Mar. 15, 2013

(86) PCT No.: PCT/IB2013/000385
§ 371 (c)(1),
(2) Date: Sep. 12, 2014

(87) PCT Pub. No.: WO2013/136163
PCT Pub. Date: Sep. 19, 2013

(65) Prior Publication Data
US 2015/0051768 A1    Feb. 19, 2015

(30) Foreign Application Priority Data
Mar. 16, 2012   (JP) ................. 2012-060729

(51) Int. Cl.
*B60W 20/00* (2006.01)
*B60K 6/26* (2007.10)
*B60W 30/184* (2012.01)
(Continued)

(52) U.S. Cl.
CPC ............. *B60W 20/00* (2013.01); *B60K 6/26* (2013.01); *B60W 30/1843* (2013.01); *F01P 7/14* (2013.01); *F16H 57/0476* (2013.01); *B60W 2510/085* (2013.01); *B60W 2510/087* (2013.01); *F01P 2023/08* (2013.01); *F01P 2070/10* (2013.01);
(Continued)

(58) Field of Classification Search
CPC .... B60K 6/26; B60W 20/00; B60W 30/1843; B60W 2510/085; B60W 2510/087; F01P 7/00; F01P 7/14; F01P 7/16; F01P 7/162; F01P 7/165; F01P 7/167; F01P 2023/08; F01P 2070/10; F16H 57/0476; F16H 61/0031; F16H 2061/0037; Y10S 903/904
See application file for complete search history.

(56) References Cited

U.S. PATENT DOCUMENTS 5,230,256 A   7/1993   Oizumi et al.
5,823,282 A   10/1998  Yamaguchi
(Continued)

FOREIGN PATENT DOCUMENTS

DE   10 2005 003 881 A1   7/2006
EP   2 322 399 A1         5/2011
(Continued)

*Primary Examiner* — Jerrah Edwards
*Assistant Examiner* — Tamara Weber
(74) *Attorney, Agent, or Firm* — Sughrue Mion, PLLC (57) ABSTRACT

A vehicle control system includes: a power unit including an electric rotary machine; an electric coolant pump configured to circulate a coolant that cools the electric rotary machine; and a control unit configured to operate the electric coolant pump based on a condition that a temperature of the electric rotary machine is equal to or higher than a predetermined operation threshold temperature, and a condition that an output of the electric rotary machine is equal to or higher than a predetermined operation threshold output.

9 Claims, 6 Drawing Sheets

(51) Int. Cl.
  *F16H 57/04* (2010.01)
  *F01P 7/14* (2006.01)
  *F16H 61/00* (2006.01)

(52) U.S. Cl.
  CPC ..... *F16H 61/0031* (2013.01); *F16H 2061/0037* (2013.01); *Y10S 903/904* (2013.01)

(56) References Cited

U.S. PATENT DOCUMENTS

| | | | |
|---|---|---|---|
| 8,909,402 B2 * | 12/2014 | Miyamoto et al. | 701/22 |
| 2003/0148850 A1 | 8/2003 | Tomohiro et al. | |
| 2004/0108149 A1 | 6/2004 | Adachi et al. | |
| 2005/0049819 A1 * | 3/2005 | Longnecker et al. | 702/132 |
| 2007/0233334 A1 * | 10/2007 | Kozarekar | 701/22 |
| 2009/0118884 A1 * | 5/2009 | Heap | 701/22 |
| 2011/0082630 A1 | 4/2011 | Kawaguchi et al. | |
| 2011/0288701 A1 * | 11/2011 | Chen | 701/22 |

FOREIGN PATENT DOCUMENTS

| | | | | |
|---|---|---|---|---|
| JP | 4-300460 A | 10/1992 | | |
| JP | 2002-155865 A | 5/2002 | | |
| JP | 2003-63258 A | 3/2003 | | |
| JP | 2007-46634 A | 2/2007 | | |
| JP | 2009-228754 A | 10/2009 | | |
| JP | 2009292319 | * 12/2009 | | B60K 11/02 |
| JP | 2010-143428 A | 7/2010 | | |
| JP | 2011-80516 A | 4/2011 | | |
| JP | 2011-106296 A | 6/2011 | | |

\* cited by examiner

VEHICLE CONTROL SYSTEM

BACKGROUND OF THE INVENTION

1. Field of the Invention

The invention relates to a vehicle control system. In particular, the invention relates to a vehicle control system, in which an electric rotary machine can be cooled with an electric coolant pump.

2. Description of Related Art

For a vehicle with an engine and an electric rotary machine, an oil pump referred to as an electric oil pump or an electrically-driven oil pump is employed as well as a mechanical oil pump, which is driven by the engine, to cool the electric rotary machine, an automatic transmission, or similar component. The electric oil pump and the electrically-driven oil pump are driven with a battery or similar member even when an engine stops.

For example, Japanese Patent Application Publication No. 2011-106296 (JP 2011-106296 A) discloses a vehicle that includes a mechanical oil pump and an electric oil pump and controls automatic stop of the engine according to a driving state of the electric oil pump. Here, the following is disclosed. In the case where the actual rotation speed of a motor of the electric oil pump exceeds a predetermined upper limit value or falls below a predetermined lower limit value, it is determined that a required hydraulic pressure cannot be supplied by the electric oil pump during the automatic stop of the engine and then the automatic stop of the engine is inhibited.

Additionally, Japanese Patent Application Publication No. 2009-228754 (JP 2009-228754 A) discloses a control unit that supplies a hydraulic pressure to a hydraulic mechanism by controlling either an engine-driven mechanical oil pump or a battery-driven electric oil pump. This description also discloses that a degree of deterioration of these oil pumps is determined based on a difference between the target discharge amount and the actual discharge amount of each oil pump, and a driving time ratio of these oil pumps is changed according to this difference, for example.

Japanese Patent Application Publication No. 2002-155865 (JP 2002-155865 A) points out the following. In the case where an electric oil pump is provided together with a mechanical oil pump directly coupled to a crankshaft of an engine, driving only the electric oil pump over long period accelerates its deterioration. This description also discloses that the operation period of the electric oil pump is obtained based on detection signals of a rotation speed sensor of the engine and a vehicle speed sensor, and when the operation period exceeds a predetermined permissible operating period, the engine is started to supply a hydraulic pressure by the mechanical oil pump.

Since the mechanical oil pump is driven by the engine with a sufficient driving force; therefore, influence on fuel consumption is little. However, when the engine stops, the mechanical oil pump cannot cool the electric rotary machine or similar component. Meanwhile, since the electric oil pump is battery-driven, the electric rotary machine or similar component can be cooled regardless of whether the engine is stopped or not. However, the electric oil pump consumes electric power. This reduces economic efficiency of the electric power. Accordingly, operation of the electric oil pump improves performance in cooling the electric rotary machine or similar component while the economic efficiency of the electric power is degraded.

In the running of the vehicle, extending a running distance may be desired by giving importance to the economic efficiency of fuel and the electric power. Meanwhile, increasing an output of a power unit may be desired at the cost of the economic efficiency of the fuel and the electric power. As a condition for operating the electric oil pump of the related art, for example, the electric oil pump starts operating when temperature of a coolant becomes equal to or higher than a predetermined temperature. However, this is not enough to meet economic efficiency, output performance, or other features regarding the running of the vehicle.

SUMMARY OF THE INVENTION

The invention provides a vehicle control system that makes it possible to control operation of an electric coolant pump in consideration of economic efficiency and output performance for vehicle running.

A vehicle control system according to an aspect of the invention includes: a power unit having an electric rotary machine; an electric coolant pump configured to circulate a coolant that cools the electric rotary machine; and a control unit configured to operate the electric coolant pump based on a condition that a temperature of the electric rotary machine is equal to or higher than a predetermined operation threshold temperature, and a condition that an output of the electric rotary machine is equal to or higher than a predetermined operation threshold output.

In the vehicle control system according to the above-described aspect of the invention, it is preferable that the control unit be configured to operate the electric coolant pump when the temperature of the electric rotary machine is equal to or higher than the predetermined operation threshold temperature and the output of the electric rotary machine is equal to or higher than the predetermined operation threshold output, in a case where a vehicle drive mode is an economy mode, in which a high priority is given to economic efficiency, and the control unit be configured to operate the electric coolant pump when the temperature of the electric rotary machine is equal to or higher than the predetermined operation threshold temperature or the output of the electric rotary machine is equal to or higher than the predetermined operation threshold output, in a case where the vehicle drive mode is a powerful mode, in which a high priority is given to output performance.

In the vehicle control system according to the above-described aspect of the invention, it is preferable that the control unit be configured to make selection from the economy mode and the powerful mode in accordance with a drive mode command given by a user.

In the vehicle control system according to the above-described aspect of the invention, it is preferable that the control unit be configured to make selection from the economy mode and the powerful mode in accordance with information specifying a vehicle running state.

In the vehicle control system according to the above-described aspect of the invention, it is preferable that the control unit be configured to set a hysteresis, characteristic for determination as to whether to operate the electric coolant pump.

In the vehicle control system according to the above-described aspect of the invention, it is preferable that the control unit be configured to set the operation threshold temperature, at which the electric coolant pump starts operating, to a temperature higher than a stop threshold temperature, at which the electric coolant pump stops operating.

In the vehicle control system according to the above-described aspect of the invention, it is preferable that the control unit be configured to set the operation threshold temperature and the stop threshold temperature such that a difference between the operation threshold temperature and the stop threshold temperature takes at least two different values, one of which is a first temperature difference corresponding to a first output value, which is a value of the output of the electric rotary machine, the other of which is a second temperature difference corresponding to a second output value, which is a value of the output of the electric rotary machine and is larger than the first output value, and the second temperature difference is greater than the first temperature difference.

In the vehicle control system according to the above-described aspect of the invention, it is preferable that the control unit be configured to set the operation threshold output, at which the electric coolant pump starts operating, such that the operation threshold output is higher than a stop threshold output, at which the electric coolant pump stops operating.

In the vehicle control system according to the above-described aspect of the invention, it is preferable that the control unit be configured to set the operation threshold output and the stop threshold output such that a difference between the operation threshold output and the stop threshold output takes at least two different values, one of which is a first output difference corresponding to a first temperature value, which is a value of the temperature of the electric rotary machine, the other of which is a second output difference corresponding to a second temperature value, which is a value of the temperature of the electric rotary machine and is larger than the first temperature value, and the second output difference is greater than the first output difference.

The above-described configuration allows the vehicle control system to operate the electric coolant pump based on the condition that the temperature of the electric rotary machine is equal to or higher than the predetermined operation threshold temperature, and the condition that the output of the electric rotary machine is equal to or higher than the predetermined operation threshold output. The temperature of the electric rotary machine relates to economic efficiency of an electric power through necessity for operation of the electric coolant pump. The output of the electric rotary machine relates to the output performance of the vehicle. Since the control is performed based on these two factors, this configuration makes it possible to control operation of the electric coolant pump in consideration of economic efficiency and output performance for vehicle running.

The operation of the electric coolant pump based on an AND condition of the condition related to the temperature of the electric rotary machine and the condition related to the output of the electric rotary machine is compared with the operation of the electric coolant pump based on an OR condition of these two conditions. The condition for operating the electric coolant pump in the former case is narrower, or more strict, than that in the latter case. Accordingly, the former case reduces the power consumption so as to ensure higher economic efficiency of electric power while the latter case causes higher power consumption but provides a high degree of freedom in output performance of the vehicle. As a result, if the control unit is configured to operate the electric coolant pump when the temperature of the electric rotary machine is equal to or higher than the predetermined operation threshold temperature and the output of the electric rotary machine is equal to or higher than the predetermined operation threshold output, in a case where a vehicle drive mode is an economy mode, in which a high priority is given to economic efficiency, and the control unit is configured to operate the electric coolant pump when the temperature of the electric rotary machine is equal to or higher than the predetermined operation threshold temperature or the output of the electric rotary machine is equal to or higher than the predetermined operation threshold output, in a case where the vehicle drive mode is a powerful mode, in which a high priority is given to output performance, and the operation condition of the electric coolant pump is changed in this way, it is made possible to control the operation of the electric coolant pump in consideration of economic efficiency and output performance for vehicle running.

In the vehicle control system, if the control unit is configured to make selection from the economy mode and the powerful mode in accordance with the drive mode command given by the user, that is, a drive mode selection switch is disposed at the vehicle, for example, the user can switch the vehicle drive mode between the economy mode and the powerful mode according to the vehicle running state such as residential area running and uphill running.

In the vehicle control system, if the control unit is configured to make selection from the economy mode and the powerful mode in accordance with information specifying the vehicle running state, that is, for example, a navigation unit is mounted on the vehicle and the economy mode and the powerful mode are switched according to the vehicle running state such as residential area running and uphill running in accordance with information from the navigation unit, the economy mode and the powerful mode are automatically switched without determination by the user.

In the vehicle control system, if the control unit is configured to set the hysteresis characteristic for determination as to whether to operate the electric coolant pump, repeat of operation start and operation stop of the electric coolant pump in a short time is prevented, so that long service life of the electric coolant pump is ensured.

In the vehicle control system, if the control unit is configured to set the operation threshold temperature and the stop threshold temperature such that a difference between the operation threshold temperature and the stop threshold temperature takes at least two different values, one of which is a first temperature difference corresponding to a first output value, which is a value of the output of the electric rotary machine, the other of which is a second temperature difference corresponding to a second output value, which is a value of the output of the electric rotary machine and is larger than the first output value, and the second temperature difference is greater than the first temperature difference, in the case where the output of the electric rotary machine is large, the period of time, during which the electric coolant pump is operated, is set long to sufficiently cool the electric rotary machine, and on the other hand, in the case where the output of the electric rotary machine is small, the period of time, during which the electric coolant pump is operated, is set short to prevent excessive cooling. As a result, economic efficiency of the electric power is improved.

In the vehicle control system, if the control unit is configured to set the operation threshold output and the stop threshold output such that a difference between the operation threshold output and the stop threshold output takes at least two different values, one of which is a first output difference corresponding to a first temperature value, which is a value of the temperature of the electric rotary machine, the other of which is a second output difference corresponding to a second temperature value, which is a value of the temperature of the electric rotary machine and is larger than the first temperature value, and the second output difference is greater than the first output difference, in the case where the temperature of the electric rotary machine is high, the period of time, during which the electric coolant pump is operated, is set long to sufficiently cool the electric rotary machine, and on the other hand, in the case where the temperature of the electric rotary machine is low, the period of time, during which the electric coolant pump is operated, is set short to prevent excessive cooling. As a result, economic efficiency of the electric power is improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A detailed description will be given of an embodiment according to the invention with reference to the attached drawings. The following describes a hybrid vehicle with an engine and an electric rotary machine as a vehicle. However, this is an example for explanation. Any configuration is possible as long as the vehicle includes an electric rotary machine. For example, an electric vehicle without an engine may be employed. As a power unit of the hybrid vehicle, a configuration including an engine, one electric rotary machine, and a power transmission mechanism provided between the engine and the one electric rotary machine will be described. This is also an example for explanation. Here, as a hybrid vehicle, any configuration is possible as long as the hybrid vehicle has the engine and the electric rotary machine. The relationship between an output of the engine and an output of the electric rotary machine can be changed according to specifications of the vehicle as necessary. Further, the electric rotary machine in the vehicle will be described as one electric rotary machine. This is also an example for explanation. A plurality of electric rotary machines may be mounted on the vehicle. For example, a configuration where one electric rotary machine is employed for traction and the other electric rotary machine is employed for electricity generation, or a configuration where a front-wheel drive and a rear-wheel drive independently employ each electric rotary machine, may be adopted.

A description will be given of an automatic transmission fluid (ATF), which is also employed as a lubricant, as a coolant that cools the electric rotary machine. This is an example for explanation. A cooling fluid other than the ATF may be employed. Accordingly, a coolant pump that circulates the coolant is denoted as an oil pump. This also applies in the case where the ATF is employed.

Further, as a power supply of a driver circuit of the electric oil pump, the power supply will be described as a low voltage power supply independent from the power supply unit of the electric rotary machine. This is an example for explanation. For example, electric power, which is converted to a low voltage, from the power supply unit of the electric rotary machine may be supplied to the driver circuit of the electric oil pump.

The following description assumes that the electric rotary machine and the power transmission mechanism are housed in one case body and the coolant is circulated between inside of the case and the oil pump unit. This is an example for explanation. For example, a configuration may be adopted, in which the electric rotary machine and the power transmission mechanism are not housed in one case and the coolant is circulated among the electric rotary machine, the power transmission mechanism, and the oil pump unit.

In the following description, like reference numerals designate corresponding or identical elements throughout the various drawings, and therefore such elements will not be further elaborated here. In the description, reference numerals described in a preceding part will be used later as required.

Figure 1:
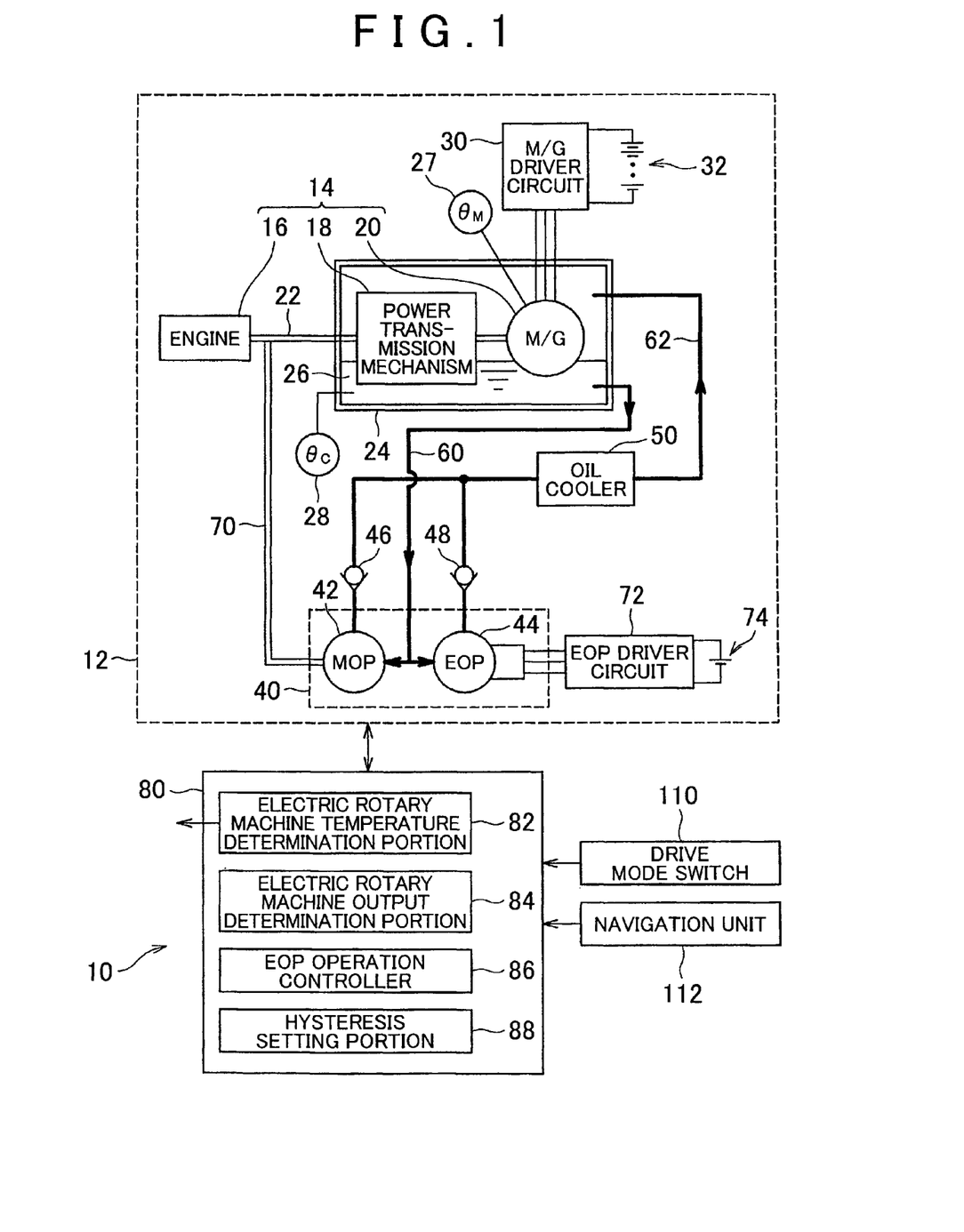
FIG. 1 is a schematic diagram illustrating a configuration of a vehicle control system according to an embodiment of the invention.

FIG. 1 is schematic diagram illustrating a configuration of a vehicle control system 10 of a hybrid vehicle. This vehicle control system 10 is a system that includes a cooling structure 12 of an electric rotary machine 20, which is mounted on the hybrid vehicle, and a control unit 80.

The cooling structure 12 includes an engine 16 and the electric rotary machine 20, which is illustrated as a motor generator (M/G) in FIG. 1, as a power unit 14, which is a driving power source of the hybrid vehicle. The cooling structure 12 also includes an M/G driver circuit 30, which is coupled to the electric rotary machine 20, and a high voltage power supply 32, which is a power supply of the M/G driver circuit 30. The cooling structure 12 further includes an oil pump unit 40 that circulates and supplies a coolant 26 to the inside of a case body 24, which includes the electric rotary machine 20 therein. The oil pump unit 40 includes a mechanical oil pump 42, which is illustrated as MOP in FIG. 1, and an electric oil pump 44, which is illustrated as EOP in FIG. 1.

The power unit 14 includes the engine 16, the electric rotary machine 20, and a power transmission mechanism 18 disposed between these components. The engine 16 is an internal combustion engine. The electric rotary machine 20 is a motor generator (M/G) mounted on the hybrid vehicle. The electric rotary machine 20 is a three-phase synchronous rotary electric machine, which functions as a motor when electric power is supplied from the M/G driver circuit 30 and functions as an electric generator during driving with the engine 16 or at braking of the hybrid vehicle.

A temperature sensor 27, which is disposed at the electric rotary machine 20, is rotary electric temperature sensing means for sensing a temperature $\theta_M$ of the electric rotary machine 20. Sensed data of the temperature sensor 27 is transmitted to a control unit 80 via an appropriate signal line (not shown).

The power transmission mechanism 18 is a mechanism having a function of allocating power, which is to be supplied to the hybrid vehicle, to an output of the engine 16 and an output of the electric rotary machine 20. As this power transmission mechanism 18, a planetary gear mechanism, which is coupled to three shafts: an output shaft of the engine 16, an output shaft of the electric rotary machine 20, and an output shaft connected to an axle (not shown), may be employed. The shaft that couples the power transmission mechanism 18 and the engine 16 in FIG. 1 is an output shaft 22 of the engine 16. This output shaft 22 is coupled to a drive shaft of the mechanical oil pump 42 via a coupling shaft 70 and is used to drive the mechanical oil pump 42.

The M/G driver circuit 30 is a circuit including an inverter, which converts electric power between a direct current (DC) power of the high voltage power supply 32 and an alternating current (AC) power for driving the electric rotary machine 20. The inverter is a circuit that generates a three-phase driving signal by a pulse width modulation (PWM) control, which appropriately controls on/off timing of a plurality of switching elements, and supplies the three-phase driving signal to the electric rotary machine 20. The PWM control is control that modulates a pulse width by comparing a fundamental wave signal, which has a cycle corresponding to a rotation cycle of the electric rotary machine 20, with a carrier signal having a saw-tooth waveform. The inverter brings an output of the electric rotary machine 20 into a desired operating state by this PWM control.

The high voltage power supply 32 is a rechargeable high-voltage secondary battery. Specifically, the high voltage power supply 32 may be a lithium-ion battery pack with a terminal voltage of about 200 V to about 300 V. The battery pack includes a plurality of cells, which are each referred to as an electric cell or a battery cell, with a terminal voltage of 1 V to several volts. The plurality of cells are combined to obtain the above-described predetermined terminal voltage. Besides this, as the high voltage power supply 32, a nickel hydrogen battery pack, a large-capacity capacitor, or similar unit may be employed.

The case body 24 is a chassis that internally includes the power transmission mechanism 18 and the electric rotary machine 20. In the internal space of the case body 24, the coolant 26 is accumulated. The coolant 26 is to lubricate movable parts of the power transmission mechanism 18 and the electric rotary machine 20 and to cool the power transmission mechanism 18 and the electric rotary machine 20. As a coolant, a lubricant referred to as ATF may be employed.

A temperature sensor 28, which is disposed at the case body 24, is coolant temperature sensing means for sensing a temperature $\theta_C$ of the coolant 26. Sensed data of the temperature sensor 28 is transmitted to the control unit 80 via an appropriate signal line (not shown).

The oil pump unit 40 is a unit that includes the mechanical oil pump 42 and the electric oil pump 44. The oil pump unit 40 is a coolant pump unit that circulates and supplies the coolant 26 to the internal space of the case body 24. A coolant discharge path 60 is, a coolant flow pipe that connects a lower side portion of the case body 24 in the gravity direction, that is, a coolant outlet disposed at a portion close to the bottom portion of the case body 24, to the oil pump unit 40. A coolant supply path 62 is a coolant flow pipe that connects the oil pump unit 40 to an upper side portion of the case body 24 in the gravity direction, that is, a coolant inlet disposed at a portion close to the ceiling portion of the case body 24. An oil cooler 50 is a heat exchanger that lowers temperature of the coolant 26 by air cooling or water cooling.

The mechanical oil pump 42 is a mechanical coolant pump where its drive shaft is coupled to the output shaft 22 of the engine 16 via the coupling shaft 70. The mechanical oil pump 42 is driven during operation of the engine 16. That is, the mechanical oil pump 42 starts operating at the start of the engine 16 and stops operating when the engine 16 stops.

The electric oil pump 44 is an electric coolant pump that is driven by an EOP driver circuit 72 under a control signal from the control unit 80. DC power is supplied from a low voltage power supply 74 to the EOP driver circuit 72. A low voltage means that a voltage is low compared with a voltage of the high voltage power supply 32, and a voltage about 12 V to 16 V may be employed, for example. As a motor that rotates the drive shaft of the electric oil pump 44, a three-phase synchronous motor may be employed. In this case, the EOP driver circuit 72 includes an inverter having a DC-AC conversion function. Additionally, changing on/off duty, or duty ratio, of the PWM control of the inverter can change an output of the electric oil pump 44.

Instead of a three-phase synchronous motor, a single-phase AC motor or a DC motor may be used. The content of the EOP driver circuit 72 is changed according to the type of the employed as a motor to rotate the drive shaft of the electric oil pump 44.

The mechanical oil pump 42 and the electric oil pump 44 are coupled in parallel with each other between the coolant discharge path 60 and the coolant supply path 62. A check valve 46 is a valve disposed to prevent backflow of the coolant 26 between the mechanical oil pump 42 and the coolant inlet of the case body 24. Similarly, a check valve 48 is a valve disposed to prevent backflow of the coolant 26 between the electric oil pump 44 and the coolant inlet of the case body 24.

The control unit 80 has a function of controlling respective elements described above as a whole. Here, especially, the control unit 80 has a function of making a selection of drive mode of the hybrid vehicle from an economy mode and a powerful mode, and controlling operation of the electric oil pump 44 according to the selection. This control unit 80 may be a computer appropriate for mounting on the hybrid vehicle.

Here, setting the drive mode of the hybrid vehicle to the economy mode means the following. As for the engine 16, improvement of fuel consumption, which represents fuel economy, takes priority. As for the electric rotary machine 20, improvement of electric mileage, which represents electric power economy, takes priority. By setting the economy mode, for example, a distance that the hybrid vehicle can run by one charge of the high voltage power supply 32 can be extended. For stable running such as running in a residential area and an urban area, setting to the economy mode is preferred.

Additionally, setting the drive mode of the hybrid vehicle to the powerful mode means that an output of the power unit 14 is increased so that increase in the vehicle acceleration performance or similar specification takes priority. For uphill running, at overtaking on a highway, or similar condition, setting to the powerful mode is preferred.

A drive mode switch 110, which is coupled to the control unit 80, is an operation element operated by a user such as the driver of the hybrid vehicle. The drive mode switch 110 is selection determining means with which the drive mode of the hybrid vehicle can be set to the economy mode or the powerful mode. When the drive mode of the hybrid vehicle is selected by operating the drive mode switch 110, operation of the electric oil pump 44 is automatically controlled according to the selected drive mode. This drive mode switch 110 may be disposed at an operation panel in a vehicle cabin or similar place.

Additionally, a navigation unit 112, which is coupled to the control unit 80, is a unit that transmits information such as road conditions, under which the hybrid vehicle runs, to the control unit 80. For example, information that specifies a running state of a vehicle, such as information whether the road on which the hybrid vehicle is currently running or will run in near future is an uphill road, a downhill road, or a flat road, information whether the district where the hybrid vehicle is currently running or will run in near future is an urban area or a residential area or similar information, and information concerning the speed limit of the road, is provided. Based on the information that specifies the running state of the vehicle, the control unit 80 can determine which of the economy mode or the powerful mode is suitable for the running state of the hybrid vehicle and make selection of the drive mode of the hybrid vehicle between the economy mode and the powerful mode, according to a predetermined selection criteria. Then, according to the selected drive mode, operation of the electric oil pump 44 is automatically controlled. This navigation unit 112 can be disposed at an operation panel in a vehicle cabin or similar place.

The control unit 80 includes an electric rotary machine temperature determination portion 82, an electric rotary machine output determination portion 84, an EOP operation controller 86, and a hysteresis setting portion 88. The electric rotary machine temperature determination portion 82 obtains a temperature $\theta_M$ of the electric rotary machine 20, and determines whether or not the temperature $\theta_M$ is equal to or higher than a predetermined operation threshold temperature $\theta_{M0}$, as a condition employed for operation control of the electric oil pump 44. The electric rotary machine output determination portion 84 obtains an output $P_M$ of the electric rotary machine 20, and determines whether or not the output $P_M$ is equal to or higher than a predetermined operation threshold output $P_{M0}$, as a condition employed for operation control of the electric oil pump 44. The EOP operation controller 86 controls operation of the electric oil pump 44 based on results of determination in the electric rotary machine temperature determination portion 82 and the electric rotary machine output determination portion 84. The hysteresis setting portion 88 sets a hysteresis characteristic about whether to operate the electric oil pump 44. These functions can be achieved by running software. Specifically, these functions can be achieved by running an EOP control program.

Figure 2:
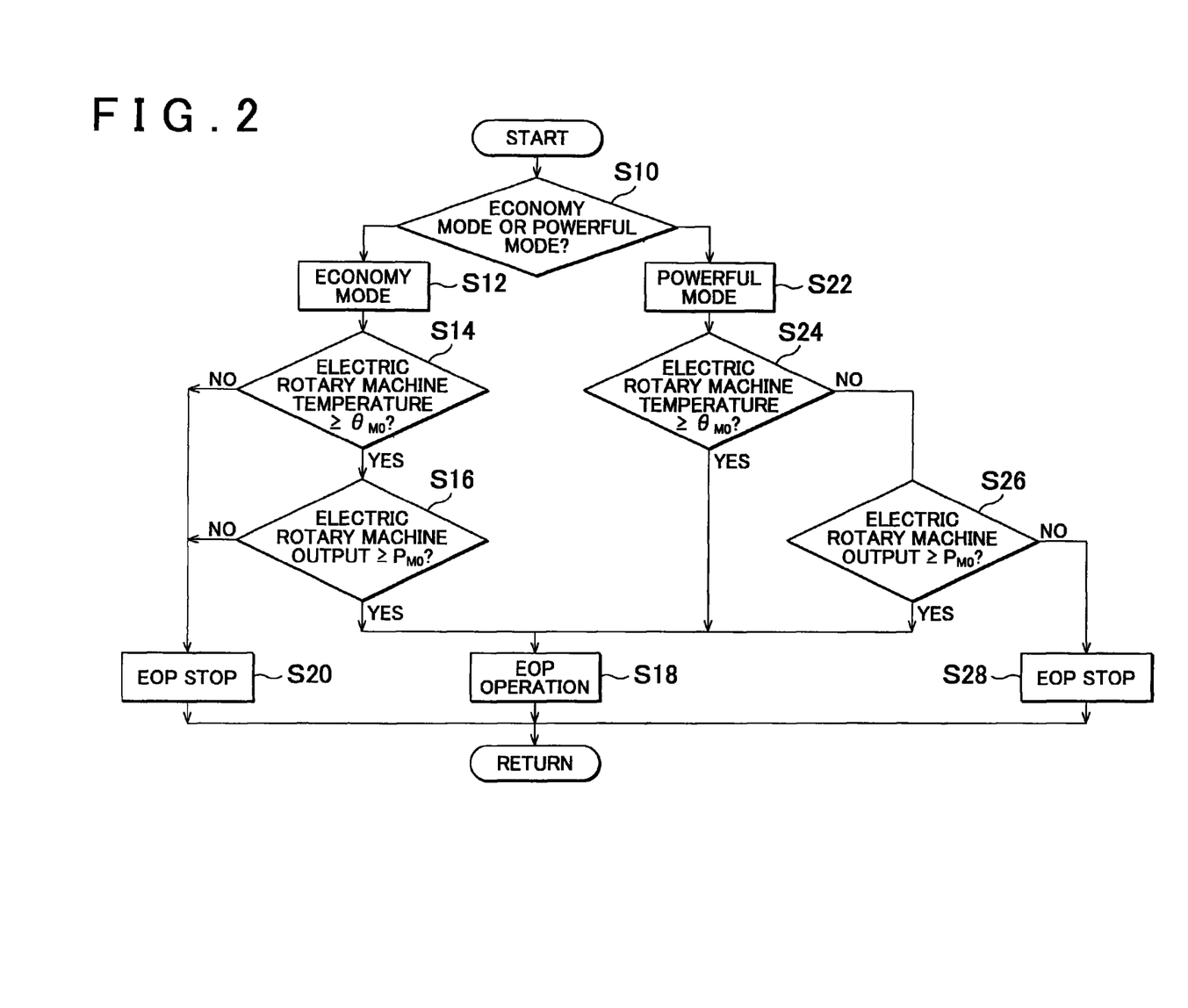
FIG. 2 is a flowchart illustrating steps of operation control of an electric oil pump according to the embodiment of the invention.

A detailed description will be given of an operation of the above-described configuration with reference to FIG. 2 and the subsequent drawings. FIG. 2 is a flowchart illustrating steps of operation control of the electric oil pump 44 according to the drive mode of the hybrid vehicle. Each step corresponds to each procedure of the EOP control program.

Here, first, as a selection of the drive mode of the hybrid vehicle, whether to select the economy mode or the powerful mode is determined (S10). When a user such as a driver operates the drive mode switch 110, this selection is made by obtaining whether the operating position corresponds to the economy mode or the powerful mode. Even if the drive mode switch 110 is not operated, the drive mode may be determined as follows. Information that specifies the running state of the vehicle, which is transmitted from the navigation unit 112, is obtained. Then, the obtained information is applied to the predetermined selection criteria.

In the case where the selected drive mode is the economy mode (S12), whether or not the temperature $\theta_M$ of the electric rotary machine 20 is equal to or higher than a predetermined operation threshold temperature $\theta_{M0}$ is determined (S14). This procedure is performed by the function of the electric rotary machine temperature determination portion 82 of the control unit 80. When the determination result of S14 is affirmative; next, whether or not an output $P_M$ of the electric rotary machine 20 is equal to or higher than a predetermined operation threshold output $P_{M0}$ is determined (S16). This procedure is performed by the function of the electric rotary machine output determination portion 84 of the control unit 80. When the determination result of S16 is affirmative, the electric oil pump 44 is operated (S18). When the determination result of S16 is negative, the electric oil pump 44 enters a stop state (S20). Here, the procedures of S18 and S20 are performed by the function of the EOP operation controller 86 of the control unit 80.

That is, in the economy mode, the electric oil pump 44 is operated in the case where the temperature $\theta_M$ of the electric rotary machine 20 is equal to or higher than the operation threshold temperature $\theta_{M0}$ and the output $P_M$ of the electric rotary machine 20 is equal to or higher than the operation threshold output $P_{M0}$. Here, the condition for operating the electric oil pump 44 is (the temperature $\theta_M$ of the electric rotary machine 20 is equal to or higher than the operation threshold temperature $\theta_{M0}$) AND (the output $P_M$ of the electric rotary machine 20 is equal to or higher than the operation threshold output $P_{M0}$).

In contrast, in the case where the determined drive mode is the powerful mode (S22), whether or not the temperature $\theta_M$ of the electric rotary machine 20 is equal to or higher than a predetermined operation threshold temperature $\theta_{M0}$ is determined (S24). This procedure is, similarly to S14, performed by the function of the electric rotary machine temperature determination portion 82 of the control unit 80. When determination result of S24 is affirmative, the electric oil pump 44 is operated (S18). Even if the determination result of S24 is negative, next, whether or not the output $P_M$ of the electric rotary machine 20 is equal to or higher than a predetermined operation threshold output $P_{M0}$ is determined (S26). If this determination result is affirmative, the electric oil pump 44 is operated (S18). If the determination result of S26 is negative, the electric oil pump 44 enters a stop state (S28). Here, similarly to S16, the procedure of S26 is performed by the function of the electric rotary machine output determination portion 84 of the control unit 80.

That is, in the powerful mode, the electric oil pump 44 is operated when the temperature $\theta_M$ of the electric rotary machine 20 is equal to or higher than the operation threshold temperature $\theta_{M0}$ or when the output $P_M$ of the electric rotary machine 20 is equal to or higher than the operation threshold output $P_{M0}$. Here, the condition for operating the electric oil pump 44 is (the temperature $\theta_M$ of the electric rotary machine 20 is equal to or higher than the operation threshold temperature $\theta_{M0}$) OR (the output $P_M$ of the electric rotary machine 20 is equal to or higher than the operation threshold output $P_{M0}$).

Figure 3:
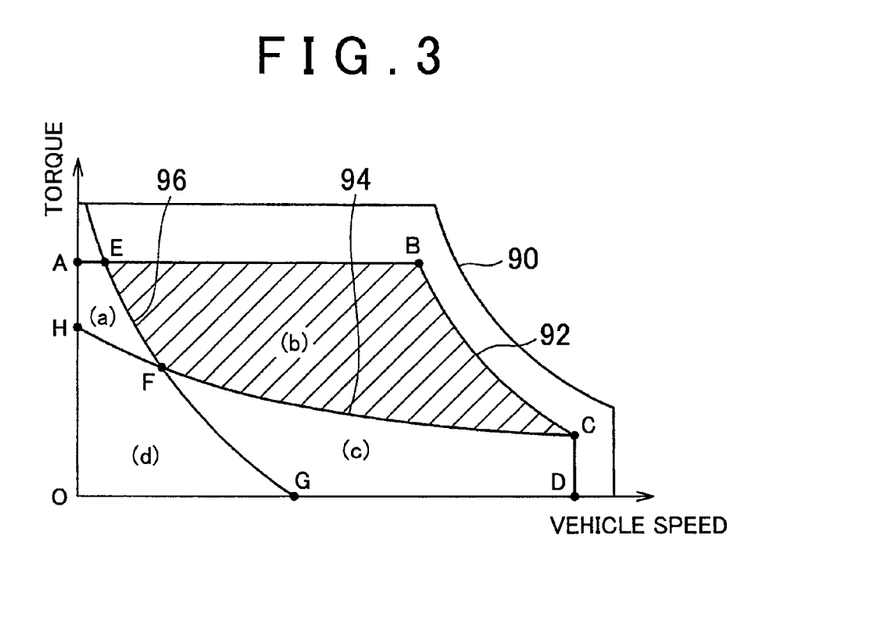
FIG. 3 illustrates an operation range, in which the electric oil pump is operated, defined by an AND condition concerning the temperature and the output of the electric rotary machine according to the embodiment of the invention.
Figure 4:
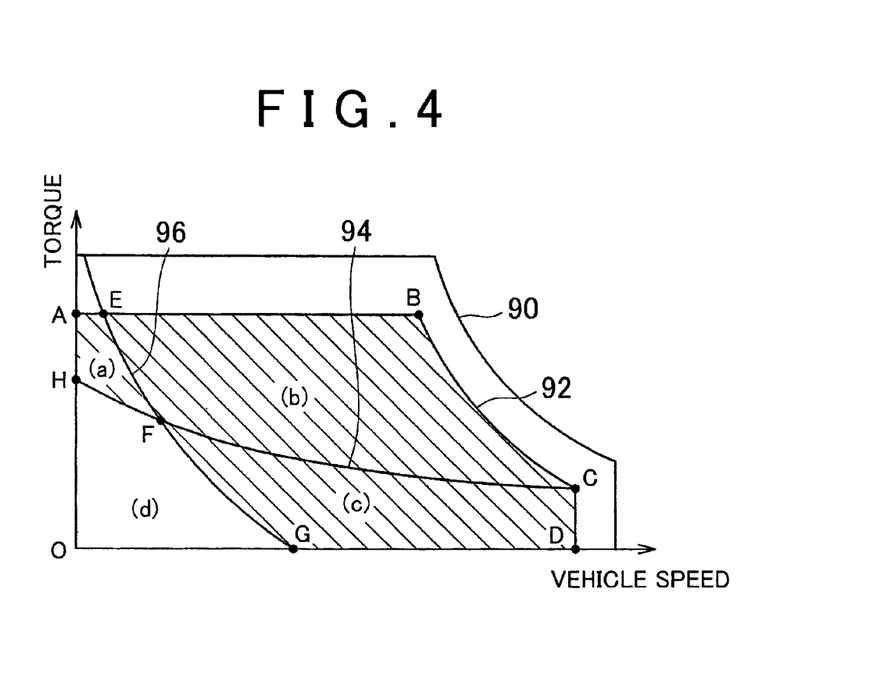
FIG. 4 illustrates an operation range, in which the electric oil pump is operated, defined by an OR condition concerning the temperature and the output of the electric rotary machine according to the embodiment of the invention.

FIGS. 3 and 4 are diagrams that compare and illustrate regions, in which the electric oil pump 44 is operated, in the case of the economy mode and in the case of the powerful mode. The horizontal axes of these diagrams indicate vehicle speed of the hybrid vehicle while the vertical axes indicate torque output from the power unit 14 of the hybrid vehicle. In the power unit 14, while the engine 16 is stopped, only the electric rotary machine 20 is operating. In this case, the vertical axes indicate a torque from the electric rotary machine 20.

In FIGS. 3 and 4, a limit operation range 90 of the power unit 14 is specified by a maximum power line, a maximum output limit line, and a maximum vehicle speed limit line of the power unit 14. Here, the output indicates power, which is expressed by a formula of "power=torque×rotation speed". The rotation speed may also be expressed by a vehicle speed. A characteristic line where an output is constant is a hyperbolic curve in each of FIGS. 3 and 4.

With the hybrid vehicle, while the engine 16 is stopped, the electric rotary machine 20 is cooled only by the electric oil pump 44. Such a running state of the hybrid vehicle corresponds to a state, for example, where the engine 16 is in automatic stop in an EV mode or a HV mode. In this case, a limit operation range 92 of the electric rotary machine 20 is within the limit operation range 90 of the power unit 14. The limit operation range 92 of the electric rotary machine 20 is a region surrounded by operation points of A, B, C, D, O, and A in FIGS. 3 and 4. The line that connects the operation points B and C is the maximum power line of the electric rotary machine 20. The line that connects the operation points A and B is the maximum output limit line of the electric rotary machine 20. The line that connects the operation points C and D is the maximum vehicle speed limit line when only the electric rotary machine 20 operates. Actually, the maximum vehicle speed limit line is the maximum rotation limit line of the electric rotary machine 20.

A description will be given of a range, in which the electric oil pump 44 is operated, while only the electric rotary machine 20 is operating.

In FIGS. 3 and 4, the temperature $\theta_M$ of the electric rotary machine 20 is expressed as a constant characteristic line 94 and the output $P_M$ of the electric rotary machine 20 is expressed as a constant characteristic line 96. The limit operation range 92 of the electric rotary machine 20 can be divided into four regions (a), (b), (c), and (d) by these characteristic lines 94 and 96. The region (a) is a region surrounded by a line of vehicle speed=(rotation speed of the electric rotary machine 20)=0, the maximum output line, the characteristic line 94, and the characteristic line 96. The region (a) is a region specified by the operation points A, E, F, and H. The region (b) is a region surrounded by the maximum output line, the maximum power line, the characteristic line 94, and the characteristic line 96. The region (b) is a region specified by the operation points E, B, C, and F. The region (c) is a region surrounded by a line of output=0, the maximum rotation limit line, the characteristic line 94, and the characteristic line 96. The region (c) is a region specified by the operation points F, C, D, and G. The region (d) is a region surrounded by a line of vehicle speed=(the rotation speed of the electric rotary machine 20)=0, a line of output=0, the characteristic line 94, and the characteristic line 96. The region (d) is a region specified by the operation points H, F, G, and O.

Here, the region where (the temperature $\theta_M$ of the electric rotary machine 20 is equal to or higher than the operation threshold temperature $\theta_{M0}$) is the region (a)+the region (b). The region where (the output $P_M$ of the electric rotary machine 20 is equal to or higher than the operation threshold output $P_{M0}$) is the region (b)+the region (c).

FIG. 3 illustrates a range, in which the electric oil pump 44 is operated in the economy mode, by the shaded area. That is, in the economy mode, the electric oil pump 44 is operated when the electric rotary machine 20 operates in the region (b). Here, the region (b) is a region in the limit operation range of the electric rotary machine 20, and meets the condition that (the temperature $\theta_M$ of the electric rotary machine 20 is equal to or higher than the operation threshold temperature $\theta_{M0}$) AND (the output $P_M$ of the electric rotary machine 20 is equal to or higher than the operation threshold output $P_{M0}$). This condition results in both affirmative determination in S14 and affirmative determination in S16 in FIG. 2, and then the electric oil pump 44 is operated in S18.

FIG. 4 illustrates a region, in which the electric oil pump 44 is operated in the powerful mode, by the shaded area. That is, in the powerful mode, in the case where the electric rotary machine 20 operates in the regions (a)+(b)+(c), the electric oil pump 44 is operated. Here, the regions (a)+(b)+(c) are regions in the limit operation range of the electric rotary machine 20, and meets the condition that (the temperature $\theta_M$ of the electric rotary machine 20 is equal to or higher than the operation threshold temperature $\theta_{M0}$) OR (the output $P_M$ of the electric rotary machine 20 is equal to or higher than the operation threshold output $P_{M0}$). This condition results in affirmative determination in S24 or affirmative determination in S26 in FIG. 2, and then the electric oil pump 44 is operated in S18.

As it can be seen by comparison between FIGS. 3 and 4, the region that satisfies (the temperature $\theta_M$ of the electric rotary machine 20 is equal to or higher than the operation threshold temperature $\theta_{M0}$) AND (the output $P_M$ of the electric rotary machine 20 is equal to or higher than the operation threshold output $P_{M0}$) is narrower than the region that satisfies (the temperature $\theta_M$ of the electric rotary machine 20 is equal to or higher than the operation threshold temperature $\theta_{M0}$) OR (the output $P_M$ of the electric rotary machine 20 is equal to or higher than the operation threshold output $P_{M0}$).

Accordingly, the region that satisfies (the temperature $\theta_M$ of the electric rotary machine 20 is equal to or higher than the operation threshold temperature $\theta_{M0}$) AND (the output $P_M$ of the electric rotary machine 20 is equal to or higher than the operation threshold output $P_{M0}$) gives a narrower region, in which the electric oil pump 44 is operated. That is, this region meets the request for improvement in electric economy or the request for increase of mileage, and is suitable when a higher priority is given to the economic efficiency.

In contrast, the region that satisfies (the temperature $\theta_M$ of the electric rotary machine 20 is equal to or higher than the operation threshold temperature $\theta_{M0}$) OR (the output $P_M$ of the electric rotary machine 20 is equal to or higher than the operation threshold output $P_{M0}$) gives a wider region, in which the electric oil pump 44 is operated, at the cost of economic efficiency. However, this ensures the high power output in the wide region: therefore, the region meets the request for the powerful mode.

Thus, the electric oil pump 44 is operated based on the condition that the temperature $\theta_M$ of the electric rotary machine 20 is equal to or higher than the predetermined operation threshold temperature $\theta_{M0}$ and the condition that the output $P_M$ of the electric rotary machine 20 is equal to or higher than the predetermined operation threshold output $P_{M0}$. This can respond appropriately to both of the economy mode and the powerful mode.

Figure 5:
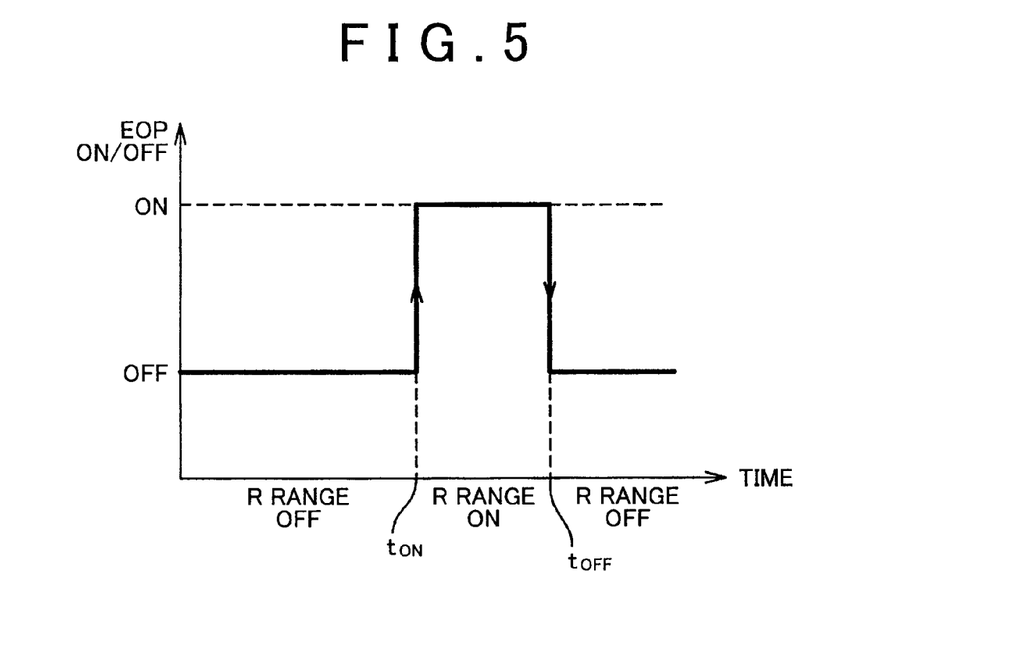
FIG. 5 is a diagram illustrating operation control of the electric oil pump in a range, during which driving only with the electric rotary machine is performed, according to the embodiment of the invention.

In the hybrid vehicle, a state where only the electric rotary machine 20 operates includes an R range, in which the vehicle is driven backward. In the R range, only the electric rotary machine 20 is employed to drive the hybrid vehicle, the load of the electric rotary machine 20 is high. Accordingly, when the R range is selected, it is preferred that the electric oil pump 44 be operated. FIG. 5 is a diagram illustrating such a state. Here, the R range is selected and turns on at the time $t_1$, and another range is selected and the R range turns off at the time $t_2$. In this case, at the time $t_1$, where the R range turns on, the electric oil pump 44 turns on and starts operating. At the time $t_2$ when the R range turns off, the electric oil pump 44 turns off and stops operating. This prevents overheating of the electric rotary machine 20 in the R range.

The electric oil pump 44 starts operating based on the temperature $\theta_M$ and the output $P_M$ of the electric rotary machine 20, which is described above. Similarly, the electric oil pump 44 stops operating based on the temperature and the output of the electric rotary machine 20. In this case, if the condition for starting the operation and the condition for stopping the operation are the same, the electric oil pump 44 may frequently repeat the start and stop of its operation when the temperature $\theta_M$ of the electric rotary machine 20 is close to the operation threshold temperature $\theta_{M0}$ and the output $P_M$ of the electric rotary machine 20 is at the operation threshold output $P_{M0}$. If the electric oil pump 44 frequently repeats the start and stop of its operation, durability of the electric oil pump 44 is reduced and this may cause a failure of the electric oil pump 44.

Figure 6:
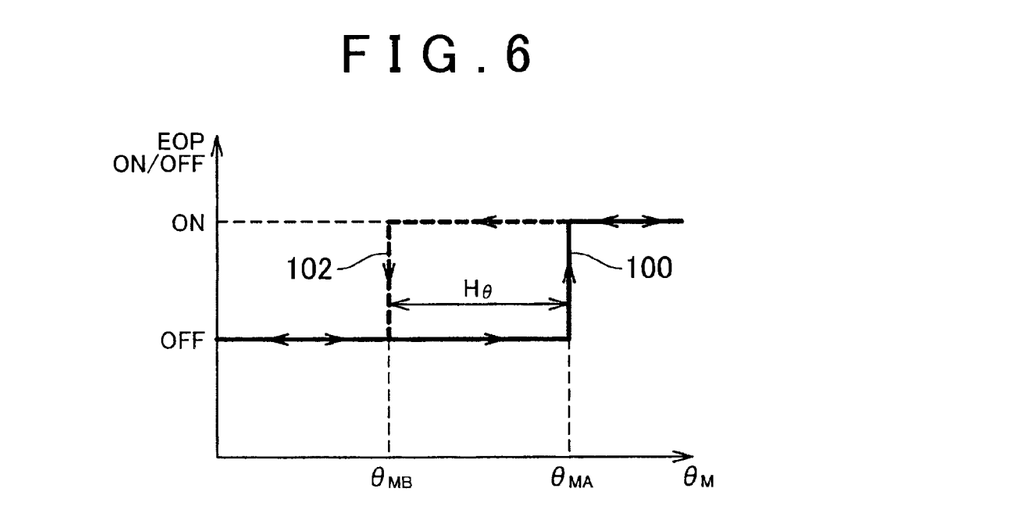
FIG. 6 is a diagram in a case where a hysteresis characteristic in temperature of the electric rotary machine is provided for switch timing between operation and stop of the electric oil pump according to the embodiment of the invention.
Figure 7:
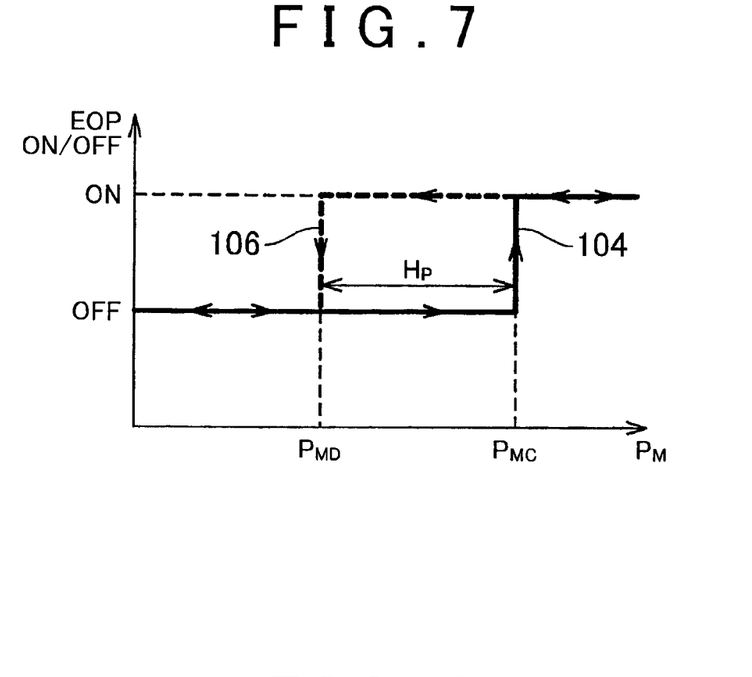
FIG. 7 is a diagram in a case where a hysteresis characteristic in output of the electric rotary machine is provided for switch timing between operation and stop of the electric oil pump according to the embodiment of the invention.

FIGS. 6 and 7 are exemplary graphs where the hysteresis characteristic is provided for the determination as to whether to operate the electric oil pump 44. The hysteresis characteristic is set by the function of the hysteresis setting portion 88 of the control unit 80.

FIG. 6 illustrates how a hysteresis characteristic in the operation threshold temperature $\theta_{M0}$ of the electric rotary machine 20 is provided for switch timing between operation and stop of the electric oil pump 44. Here, an operation threshold temperature $\theta_{MA}$, where the electric oil pump 44 starts operating, is set at a temperature higher than a stop threshold temperature $\theta_{MB}$, where the electric oil pump 44 stops operating, by H$\theta$. That is, an operation line 100, where the electric oil pump 44 starts operating, and an operation line 102, where the electric oil pump 44 stops operating, are set to be separated from each other by a hysteresis width of H$\theta$ in the form of temperature of the electric rotary machine 20.

FIG. 7 illustrates how a hysteresis characteristic in the operation threshold output $P_{M0}$ of the electric rotary machine 20 is provided for switch timing between operation and stop of the electric oil pump 44. Here, an operation threshold output $P_{MC}$, where the electric oil pump 44 starts operating, is set at an output higher than a stop threshold output $P_{MD}$, where the electric oil pump 44 stops operating, by $H_P$. That is, an operation line 104, where the electric oil pump 44 starts operating, and an operation line 106, where the electric oil pump 44 stops operating, are set to be separated from each other by a hysteresis width of $H_P$ in the form of output of the electric rotary machine 20.

Thus, the hysteresis characteristic is provided for the determination as to whether to operate the electric oil pump 44. This prevents frequent repeat of operation start and operation stop of the electric oil pump 44, thus ensuring long service life of the electric oil pump 44.

The above description assumes that the hysteresis width is constant regardless of the temperature $\theta_M$ or the output $P_M$ of the electric rotary machine 20. The hysteresis width may be changed depending on the temperature $\theta_M$ or the output $P_M$.

Figure 8:
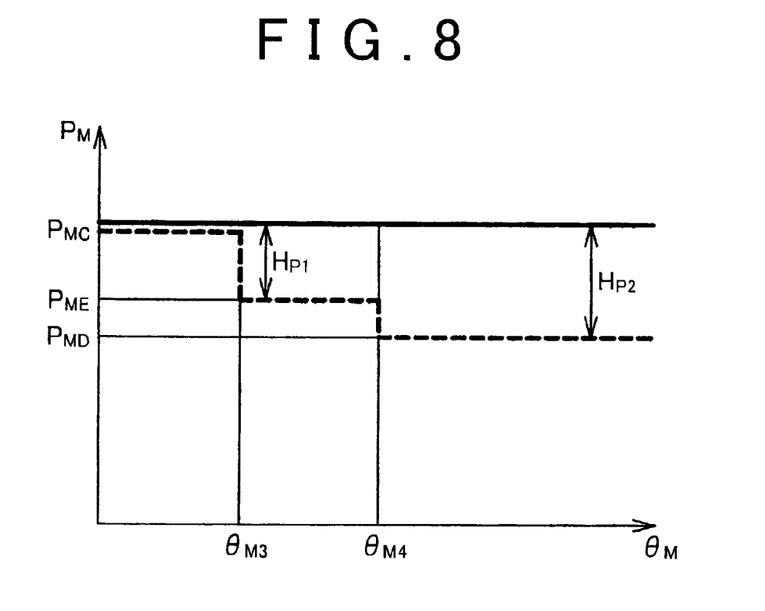
FIG. 8 is a diagram illustrating an example of changing a width of the hysteresis characteristic for operation timing of the electric oil pump depending on the temperature of the electric rotary machine according to the embodiment of the invention.

FIG. 8 is a diagram illustrating an example of changing the hysteresis width $H_P$ for operation timing of the electric oil pump 44 depending on the temperature $\theta_M$ of the electric rotary machine 20. Here, the higher the temperature $\theta_M$ of the electric rotary machine 20 becomes, the higher the hysteresis width $H_P$ illustrated in FIG. 7 is set. That is, when the temperature $\theta_M$ of the electric rotary machine 20 is equal to or less than $\theta_{M3}$, the hysteresis width $H_P$ is set to zero ($H_P$=0), and when $\theta_M$ is between $\theta_{M3}$ and $\theta_{M4}$, the hysteresis width $H_P$ is set such that $H_P=P_{MC}-P_{ME}=H_{P1}$. When $\theta_M$ is equal to or higher than $\theta_{M4}$, a hysteresis width $H_P$ is set such that $H_P=P_{MC}-P_{MD}=H_{P2}$, which is larger than $H_{P1}$. The contents of $P_{MC}$ and $P_{MD}$ are described in relation to FIG. 7.

Thus, when the temperature $\theta_M$ of the electric rotary machine 20 is high, the hysteresis width is set large to ensure the long operation period of the electric oil pump 44. This sufficiently cools the electric rotary machine 20. When the temperature $\theta_M$ of the electric rotary machine 20 is low, the hysteresis width is set small to make the operation period of the electric oil pump 44 short. This prevents excessive cooling and improves economic efficiency of the electric power.

Figure 9:
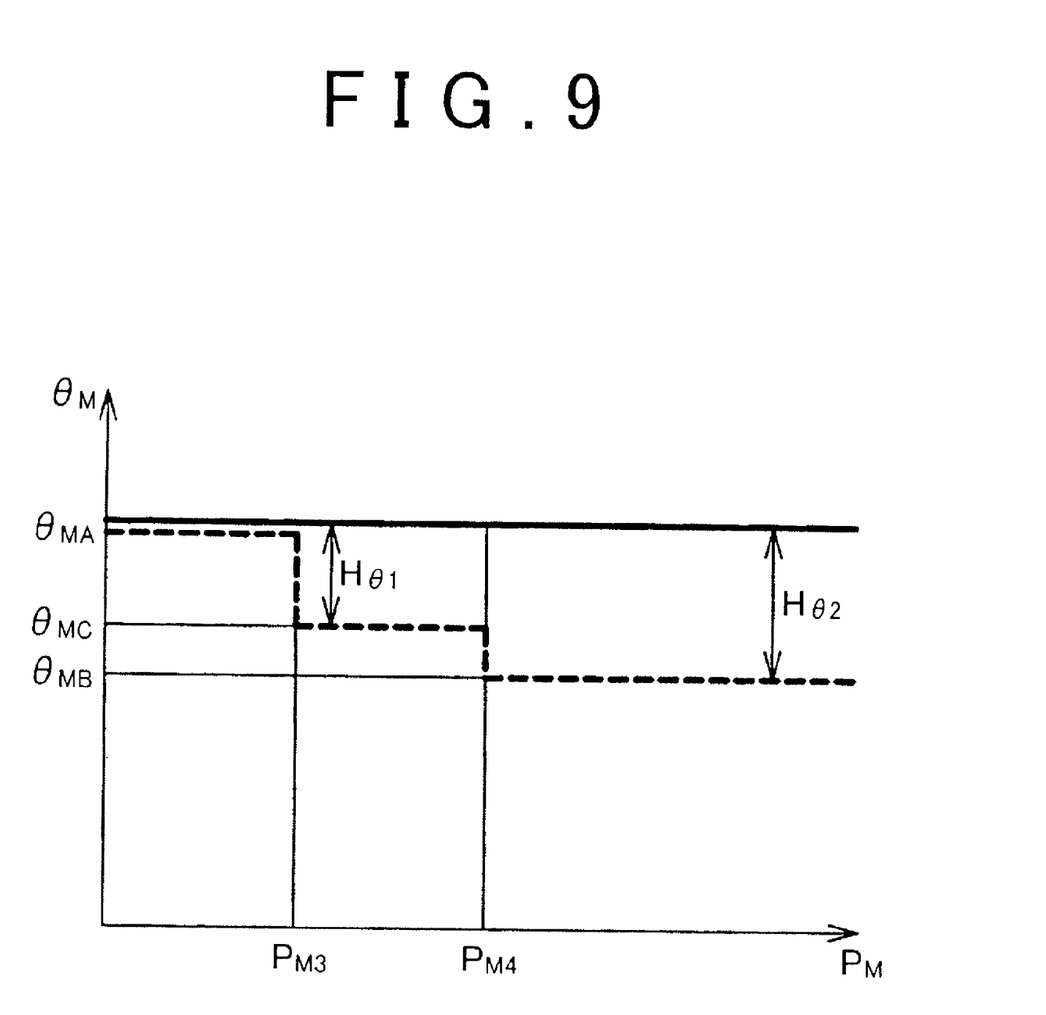
FIG. 9 is a diagram illustrating an example of changing a width of the hysteresis characteristic for operation timing of the electric oil pump depending on the output of the electric rotary machine according to the embodiment of the invention.

FIG. 9 is a diagram illustrating an example of changing the hysteresis width $H_P$ of operation timing of the electric oil pump 44 depending on the output $P_M$ of the electric rotary machine 20. Here, the higher the output $P_M$ of the electric rotary machine 20 becomes, the hither the hysteresis width H$\theta$ illustrated in FIG. 6 is set. That is, when the output $P_M$ of the electric rotary machine 20 is equal to or less than $P_{M3}$, the hysteresis width H$\theta$ is set to zero (H$\theta$=0), and when $P_M$ is between $P_{M3}$ and $P_{M4}$, the hysteresis width H$\theta$ is set such that $H\theta=\theta_{MA}-\theta_{MC}=H\theta_1$. When $P_M$ is equal to or higher than $P_{M4}$, a hysteresis width is set such that $H\theta=\theta_{MA}-\theta_{MB}=H_{P2}$, which is larger than $H\theta_1$. The contents of $\theta_{MA}$ and $\theta_{MB}$ are described in relation to FIG. 6.

Thus, when the output $P_M$ of the electric rotary machine 20 is high, the hysteresis width is set large to ensure the long operation period of the electric oil pump 44. This sufficiently cools the electric rotary machine 20. When the output $P_M$ of the electric rotary machine 20 is low, the hysteresis width is set small to make the operation period of the electric oil pump 44 short. This prevents excessive cooling and improves economic efficiency of the electric power.

The vehicle control system according to the invention is applicable to a vehicle that includes an electric oil pump.

The invention claimed is:

1. A vehicle control system comprising:
   a power unit including an electric rotary machine;
   an electric coolant pump configured to circulate a coolant that cools the electric rotary machine, where a power supply of a driver circuit of the electric coolant pump is a low voltage power supply independent from the power supply unit of the electric rotary machine; and
   a control unit configured to operate the electric coolant pump based on a condition that a temperature of the electric rotary machine is equal to or higher than a predetermined operation threshold temperature,
   wherein the control unit is configured to operate the electric coolant pump additionally based on a condition that an output of the electric rotary machine is equal to or higher than a predetermined operation threshold output, wherein the output of the electric rotary machine relates to the output performance of the vehicle,
   wherein the control unit is configured to operate the electric coolant pump when the temperature of the electric rotary machine is equal to or higher than the predetermined operation threshold temperature and the output of the e electric rotary machine is equal to or higher than the predetermined operation threshold output, in a case where a vehicle drive mode is a first mode, and
   wherein the control unit is configured to operate the electric coolant pump when the temperature of the electric rotary machine is equal to or higher than the predetermined operation threshold temperature or the output of the electric rotary machine is equal to or higher than the predetermined operation threshold output, in a case where the vehicle drive mode is a second mode.

2. The vehicle control system according to claim 1, wherein
   the first mode is an economy mode, in which a high priority is given to economic efficiency, and
   the second mode is a powerful mode, in which a high priority is given to output performance.

3. The vehicle control system according to claim 2, wherein
the control unit is configured to make selection from the economy mode and the powerful mode in accordance with a drive mode command given by a user.

4. The vehicle control system according to claim 2, wherein
the control unit is configured to make selection from the economy mode and the powerful mode in accordance with information specifying a vehicle running state.

5. The vehicle control system according to claim 1, wherein
the control unit is configured to set a hysteresis characteristic for determination as to whether to operate the electric coolant pump.

6. The vehicle control system according to claim 5, wherein
the control unit is configured to set the operation threshold temperature, at which the electric coolant pump starts operating, to a temperature higher than a stop threshold temperature, at which the electric coolant pump stops operating.

7. A vehicle control system comprising:
a power unit including an electric rotary machine;
an electric coolant pump configured to circulate a coolant that cools the electric rotary machine, where a power supply of a driver circuit of the electric coolant pump is a low voltage power supply independent from the power supply unit of the electric rotary machine; and
a control unit configured to operate the electric coolant pump based on a condition that a temperature of the electric rotary machine is equal to or higher than a predetermined operation threshold temperature,
wherein:
the control unit is configured to operate the electric coolant pump additionally based on a condition that an output of the electric rotary machine is equal to or higher than a predetermined operation threshold output, wherein the output of the electric rotary machine relates to the output performance of the vehicle;
the control unit is configured to set a hysteresis characteristic for determination as to whether to operate the electric coolant pump;
the control unit is configured to set the operation threshold temperature, at which the electric coolant pump starts operating, to a temperature higher than a stop threshold temperature, at which the electric coolant pump stops operating; and
the control unit is configured to set the operation threshold temperature and the stop threshold temperature such that a difference between the operation threshold temperature and the stop threshold temperature takes at least two different values, one of which is a first temperature difference corresponding to a first output value, which is a value of the output of the electric rotary machine, the other of which is a second temperature difference corresponding to a second output value, which is a value of the output of the electric rotary machine and is larger than the first output value, and the second temperature difference is greater than the first temperature difference.

8. A vehicle control system comprising:
a power unit including an electric rotary machine;
an electric coolant pump configured to circulate a coolant that cools the electric rotary machine, where a power supply of a driver circuit of the electric coolant pump is a low voltage power supply independent from the power supply unit of the electric rotary machine; and
a control unit configured to operate the electric coolant pump based on a condition that a temperature of the electric rotary machine is equal to or higher than a predetermined operation threshold temperature,
wherein the control unit is configured to operate the electric coolant pump additionally based on a condition that an output of the electric rotary machine is equal to or higher than a predetermined operation threshold output, wherein the output of the electric rotary machine relates to the output performance of the vehicle; and
wherein
the control unit is configured to set the operation threshold output, at which the electric coolant pump starts operating, such that the operation threshold output is higher than a stop threshold output, at which the electric coolant pump stops operating.

9. The vehicle control system according to claim 8, wherein
the control unit is configured to set the operation threshold output and the stop threshold output such that a difference between the operation threshold output and the stop threshold output takes at least two different values, one of which is a first output difference corresponding to a first temperature value, which is a value of the temperature of the electric rotary machine, the other of which is a second output difference corresponding to a second temperature value, which is a value of the temperature of the electric rotary machine and is larger than the first temperature value, and the second output difference is greater than the first output difference.

* * * * *